United States Patent

Greci

(10) Patent No.: US 9,254,454 B2
(45) Date of Patent: Feb. 9, 2016

(54) METHOD OF ASSEMBLY FOR SAND SCREEN

(71) Applicant: HALLIBURTON ENERGY SERVICES, INC., Houston, TX (US)

(72) Inventor: Stephen Greci, Little Elm, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/126,779

(22) PCT Filed: Mar. 6, 2013

(86) PCT No.: PCT/US2013/029259
§ 371 (c)(1),
(2) Date: Dec. 16, 2013

(87) PCT Pub. No.: WO2014/137332
PCT Pub. Date: Sep. 12, 2014

(65) Prior Publication Data
US 2015/0375144 A1   Dec. 31, 2015

(51) Int. Cl.
*B01D 29/11* (2006.01)
*E21B 43/08* (2006.01)

(52) U.S. Cl.
CPC .............. *B01D 29/111* (2013.01); *E21B 43/08* (2013.01); *E21B 43/082* (2013.01); *E21B 43/084* (2013.01); *E21B 43/086* (2013.01); *E21B 43/088* (2013.01); *Y10T 29/4984* (2015.01); *Y10T 29/49602* (2015.01); *Y10T 29/49604* (2015.01)

(58) Field of Classification Search
CPC ..... B01D 29/111; E21B 43/08; E21B 43/082; E21B 43/084; E21B 43/086; E21B 43/088; Y10T 29/496; Y10T 29/49602; Y10T 29/49604; Y10T 29/4984
See application file for complete search history.

(56) References Cited

U.S. PATENT DOCUMENTS

| 5,004,049 | A  | * | 4/1991  | Arterbury       | E21B 43/082 166/228 |
| 7,287,684 | B2 | * | 10/2007 | Blackburne, Jr. | B01D 29/111 166/231 |
| 7,578,344 | B2 | * | 8/2009  | Hopkins         | B01D 29/111 166/230 |
| 8,176,634 | B2 | * | 5/2012  | Bonner          | E21B 43/08 166/207 |
| 8,251,138 | B2 | * | 8/2012  | Bonner          | E21B 43/084 166/230 |
| 2004/0003927 | A1 |   | 1/2004 | Rudd | |
| 2005/0034860 | A1 |   | 2/2005 | Lauritzen | |
| 2007/0114171 | A1 | * | 5/2007 | Chen | B01D 29/15 210/489 |
| 2009/0159293 | A1 |   | 6/2009 | Jones et al. | |
| 2010/0258301 | A1 |   | 10/2010 | Bonner et al. | |

(Continued)

OTHER PUBLICATIONS

International Search Report dated Nov. 21, 2013 for Application No. PCT/US2013/029259.

(Continued)

*Primary Examiner* — Sarang Afzali
(74) *Attorney, Agent, or Firm* — Haynes and Boone, LLP

(57) ABSTRACT

A method of assembling a sand screen assembly includes the steps of providing inner and outer shrouds having radial protrusions, such as ribs, louvers, splines, etc., that are radially unaligned during a first assembly step thereby providing clearance for positioning of a filter layer between the shrouds. The outer or inner shroud is then rotated until the protrusions are aligned and the clearance between the shrouds and filter layer is eliminated to provide a tight fit between the layers.

22 Claims, 3 Drawing Sheets

(56) References Cited

U.S. PATENT DOCUMENTS

2011/0180257 A1    7/2011  Scott et al.
2012/0073801 A1*   3/2012  Greci .................. E21B 43/08
                                                        166/227

OTHER PUBLICATIONS

Written Opinion dated Nov. 21, 2013 for Application No. PCT/US2013/029259.

* cited by examiner

METHOD OF ASSEMBLY FOR SAND SCREEN

CROSS REFERENCE TO RELATED APPLICATIONS

None.

FIELD

This application relates to well screen assemblies which can be used in subterranean wellbores and, in particular, to a method of manufacture of a screen assembly via rotation of members and without the need for secondary manufacturing steps such as radial expansion or swaging.

BACKGROUND

Well screens are typically used to exclude sand and formation fines from fluids produced from subterranean wells. One or more sand control screen assemblies are commonly included in the completion string to control the movement of formation particles. Sand control screen assemblies are commonly constructed by installing one or more screen jackets on a perforated base pipe or liner. The screen jackets may include one or more drainage layers, one or more screen or filter layers, such as wire wrapped screen or single or multilayer wire mesh screen, and a perforated outer shroud.

Filter layers are known in the art and can be of various construction. For example, in "wire-wrapped" screen structures, the filter is formed by wrapping wire around the base pipe, with rods providing a standoff between the wire and the base pipe. Mesh screens consist of a woven single- or multi-layer mesh, typically of steel or other metal, shaped and combined with a protective, perforated outer covering in a cartridge, or jacket, which is slipped over a perforated base pipe. Filter layers can be formed of sintered or unsintered metal, bonded or non-bonded metal, wire mesh, multilayer wire mesh, woven wire, woven mesh, diffusion-bonded mesh, etc., as are known in the art or become known in the art. Multiple filter layers or laminates can be used in conjunction. As used herein, the term "filter layer" and similar includes multi-layer filters unless indicated otherwise.

Typically, a layer placed behind (radially inward from) the filter layer is provided to reduce resistance to fluid flow through the filter layer and is referred to as a "drainage layer." In some screen assemblies, the drainage layer is provided by placing a coarse mesh grid behind (radially inward of) the fine mesh filter layer. The drainage layer may also be made of a perforated stainless steel tube or liner, and can be referred to as an inner shroud since it is similar in construction to an outer shroud. A drainage layer can also be formed by creating a stand-off between the filter layer and inner shroud, such as by providing longitudinally and/or radially extending ribs, splines, etc., to maintain spacing between the layers.

An outer layer is typically referred to as a shroud or sleeve and can be formed of a metal tubular member having perforations extending radially through the tubular wall. The outer shroud is primarily for protection of the filter layer during insertion into the wellbore, handling, transport, etc., and can provide structural support as well. In some screen assemblies it is known to provide a stand-off between the outer shroud and the filter layer such as by providing ribs, splines, dimples, etc., on the interior surface of the outer shroud or outer surface of the filter layer.

It is known in the art to form the outer shroud separately from the filter body and slide it over an end of the inner tubular member until it surrounds the filter layer. After the shroud is disposed around the filter layer, the shroud is plastically deformed radially inwardly to reduce the inner diameter of the shroud to a value such that the filter layer can expand against the shroud. This process is also known as "swaging," and is typically achieved using a reducing mill or die. Swaging is undesirable because it adds to the time and expense of manufacturing the filter, deforms the outer shroud putting additional stresses on the shroud and affecting its material makeup, and does not guarantee that the clearance between the filter body and the shroud has been properly eliminated.

Where wire mesh is used as a filter layer in a well screen, it has been found that bonding operations (such as welding and brazing) performed on the wire mesh are detrimental to the long-term usefulness of the wire mesh. For example, the wire mesh may be thus made more susceptible to corrosion. An attempt has been made to address the problems associated with a bonded wire mesh filter layer by swaging an entire screen jacket, including the filter layer, onto a base pipe. An overlap in a wrap of the wire mesh filter layer is used instead of welding to seal the filter layer against sand migration. However, this method of swaging the screen jacket also imparts undesirable stress concentrations in the filter layer.

Assembly methods have been developed for assembling the various layers of a screen jacket or assembly. The layers can be formed by wrapping or spiral wrapping successive layers. For example, a metal wire is wrapped about an inner shroud to form a drainage layer, a filter layer is wrapped over the drainage layer, and an outer shroud is wrapped over the assembly. Wrapping techniques typically require welding, brazing, or other method, of creating a seam where the wrapped material meets, such as at the longitudinal ends of the filter layer, to form a cylinder. Obviously, such welding or other method can damage the filter layer and compromise the effectiveness and life of the screen assembly. Further, the filter layer longitudinal edges can be overlapped and secured by welding, brazing or other method involving heating of metal, crimping or other plastic deformation, or by friction with the inner and outer shrouds.

Alternately, the layers of the screen assembly can be positioned by moving (typically, lowering) one tubular layer over or into another tubular layer. For example, the outer shroud can be lowered onto a prepared inner shroud and filter layer. Such an operation requires a clearance or "play" between the layers.

It is desirable to have a tight-fit and radially thin screen assembly. Consequently, it is typical in the art to perform a secondary manufacturing process on the assembled screen assembly. Secondary processes include radial expansion, radial reduction, swaging, etc., to reduce or eliminate layer clearances, provide a press-fit or tight-fit assembly, "sandwich" the filter layer between shroud layers, etc. For example, the outer shroud can be radially reduced into secure contact with the filter layer. Alternately, the inner shroud and filter layer can be radially expanded within the outer shroud.

Further disclosure regarding screen assemblies and their manufacture can be found in the following references, each of which are hereby incorporated herein for all purposes: U.S. Pat. No. 7,287,684, to Blackburne, Jr., issued Oct. 30, 2007; U.S. Pat. App. Pub. No. 2007/0114171, to Chen, published May 24, 2007; U.S. Pat. No. 7,578,344, to Hopkins, issued Aug. 25, 2009; U.S. Pat. No. 8,176,634, to Bonner, issued May 15, 2012.

Therefore, it will be appreciated that improvements would be desirable in the art of constructing well screens. These improvements may find use in well screens which either do or do not have wire mesh filter layers.

SUMMARY

Without limiting the scope of the present inventions, embodiments are generally described with reference to a hydrocarbon bearing subterranean formation, as an example. In the present specification, systems and methods are provided which allow constructing a tight "sandwich" of a multilayer mesh screen design without having to do a second manufacturing process, such as expansion or swaging.

An inner tubular member, filter layer, and outer tubular member are positioned substantially concentrically. A clearance space exists between the filter layer and tubular members to allow positioning. The inner and outer tubular members have a plurality of cooperating radial protrusions, such as longitudinally or laterally extending ribs, splines, louvers, ridges, or spaced apart projections. The protrusions are "misaligned" during an initial assembly step, such that the protrusions on one tubular member are radially aligned with the gaps between protrusions on the other tubular member. Once the filter layer is in position between the tubular members, the tubular members are rotated with respect to one another to a second or final position wherein the protrusions on the tubular members are aligned, thereby sandwiching the filter layer and eliminating the annular clearance spaces. The screen filter assembly can then be positioned on a base pipe or liner.

The filter layer can be made of various material and take various forms, such as single or multiple layers, sintered or unsintered metal, bonded or non-bonded filters, diffusion-bonded laminates, etc. The inner and outer tubular members can be perforated shrouds, liners, support pipes, etc. The assembly preferably includes additional features, such as drainage layers radially inward or outward of the filter layer. For example, the inner shroud can provide a stand-off with the base pipe, creating a drainage layer, by radially inwardly extending protrusions.

The assembly methods provided eliminate the need for secondary manufacturing steps such as radial expansion, radial reduction, etc., while still providing a tight lay-up. These and other features, advantages, benefits and objects will become apparent to one of ordinary skill in the art upon careful consideration of the detailed description of representative embodiments herein below and the accompanying drawings, in which similar elements are indicated in the various figures using the same reference numbers.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

In the following description of the representative embodiments of the disclosure, directional terms, such as "above," "below," "upper," "lower," etc., are used for convenience in referring to the accompanying drawings.

Figure 1:
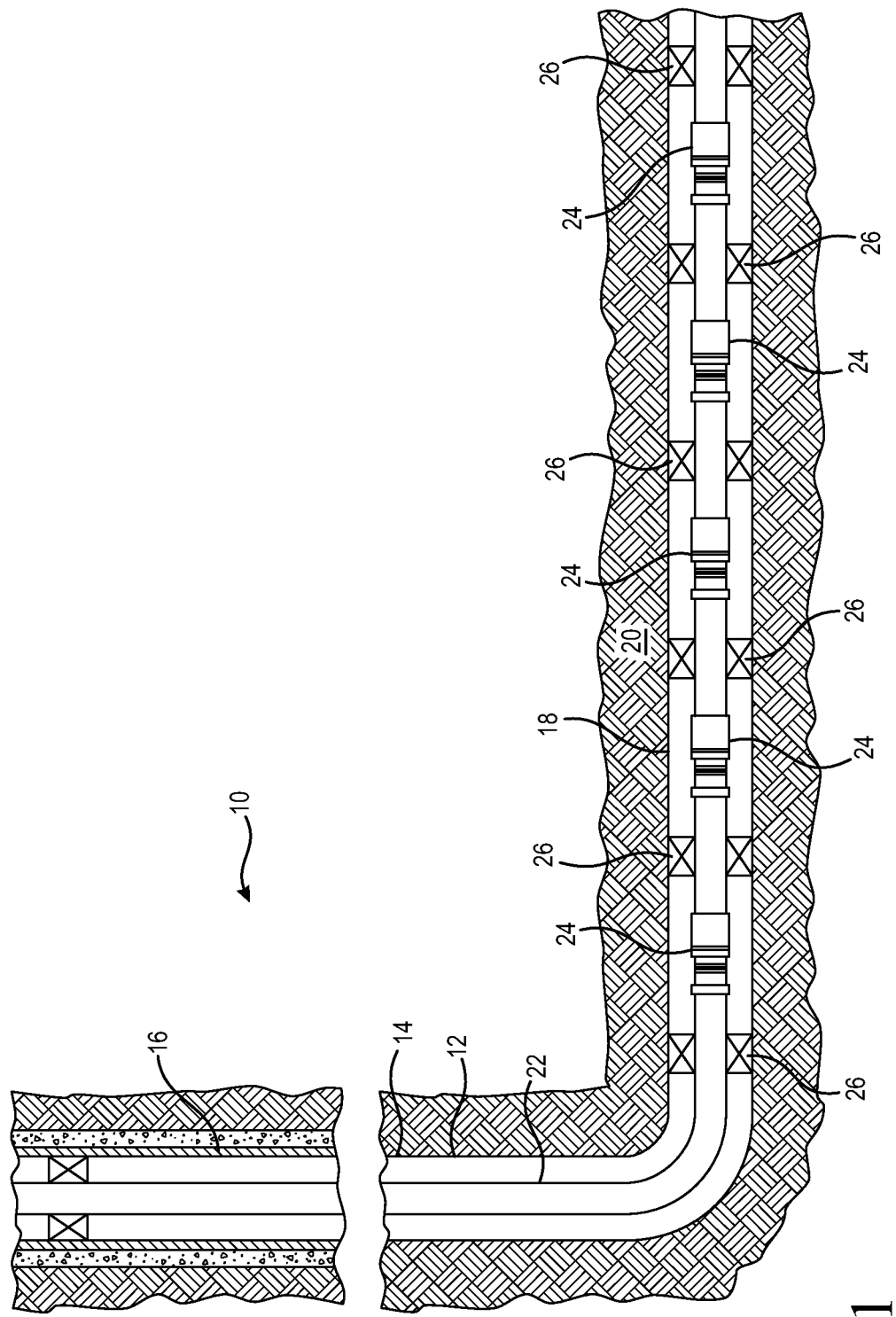
FIG. 1 is a schematic illustration of a well system operating a plurality of sand control screen assemblies according to an embodiment of the present invention.

FIG. 1 shows a well system including a plurality of sand control screen assemblies embodying principles of the present invention that is schematically illustrated and generally designated 10. In the illustrated embodiment, a wellbore 12 extends through the various earth strata. Wellbore 12 has a substantially vertical section 14, the upper portion of which has cemented therein a casing string 16. Wellbore 12 also has a substantially horizontal section 18 that extends through a hydrocarbon bearing subterranean formation 20. As illustrated, substantially horizontal section 18 of wellbore 12 is open hole.

Positioned within wellbore 12 and extending from the surface is a tubing string 22. At its lower end, tubing string 22 is coupled to a completion string that has been installed in wellbore 12. The completion string includes a plurality of sand control screen assemblies 24, each of which is positioned between a pair of packers 26 that provides a fluid seal between the completion string 22 and wellbore 12, thereby defining the production intervals. Sand control screen assemblies 24 serve the primary functions of filtering particulate matter out of the production fluid stream and may also include flow control capabilities or other additional functionality.

Even though FIG. 1 depicts the sand control screen assemblies of the present invention in an open hole environment, it should be understood by those skilled in the art that the present invention is equally well suited for use in cased wells. Also, even though FIG. 1 depicts one sand control screen assembly in each production interval, it should be understood by those skilled in the art that any number of sand control screen assemblies of the present invention may be deployed within a production interval without departing from the principles of the present invention. Further, even though FIG. 1 depicts each sand control screen assemblies as having a single screen jacket, it should be understood by those skilled in the art that any number of screen jackets may be installed on a single sand control screen assembly of the present invention without departing from the principles of the present invention.

In addition, even though FIG. 1 depicts the sand control screen assemblies of the present invention in a horizontal section of the wellbore, it should be understood by those skilled in the art that the present invention are equally well suited for use in deviated wellbores, vertical wellbores, multilateral wellbores and the like. Accordingly, it should be understood by those skilled in the art that the use of directional terms such as above, below, upper, lower, upward, downward, uphole, downhole and the like are not used in a limiting sense.

Figure 2:
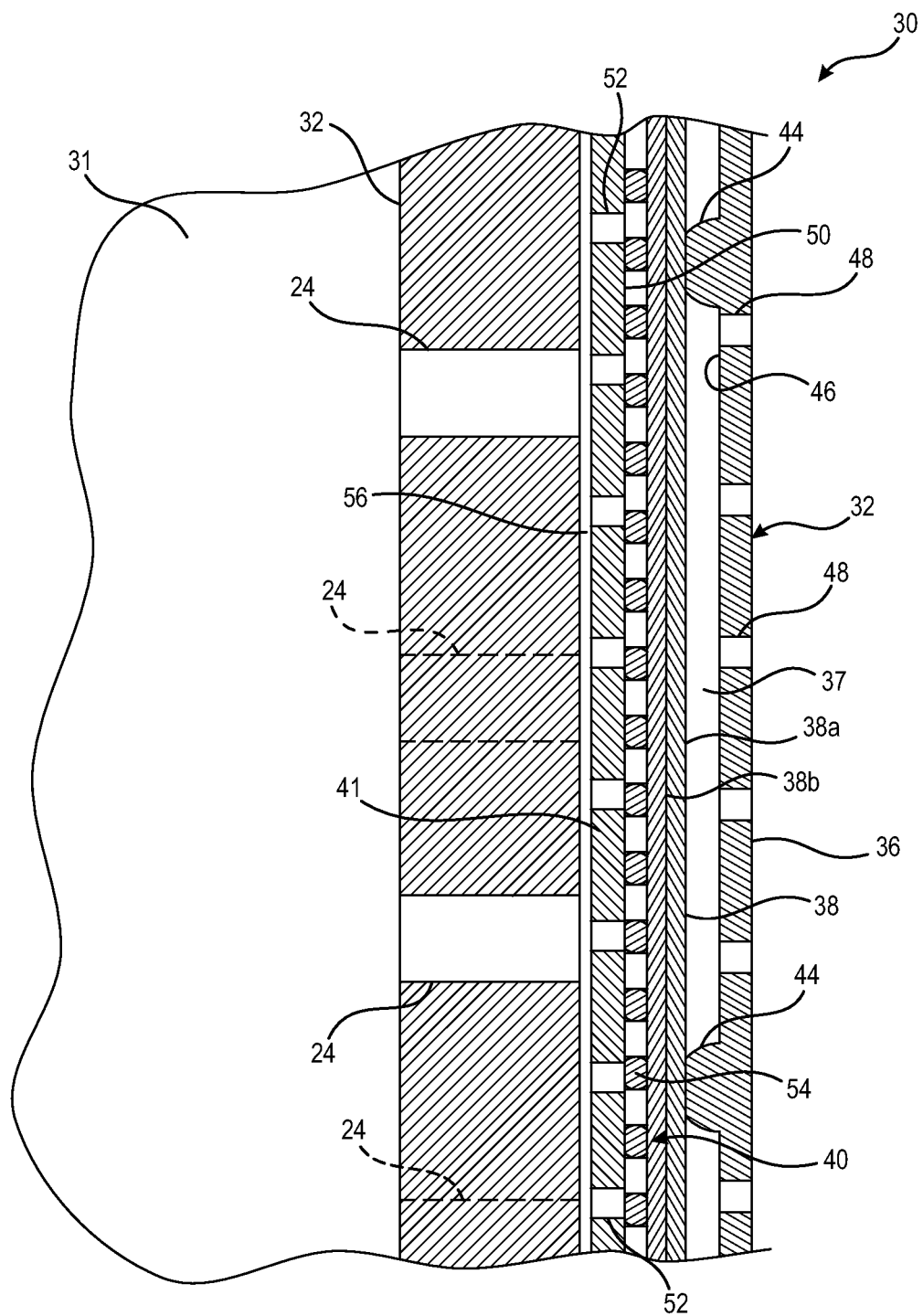
FIG. 2 is an enlarged scale cross-sectional view of an exemplary screen assembly provided for reference and having various layers and features.

FIG. 2 illustrates a cross-sectional partial view of an exemplary well screen assembly 30 for purposes of discussion and orientation. The screen assembly 30 shown is merely exemplary of the various layers, order of layers, etc., of a typical well screen and is not limiting. In this example, the screen jacket 32 includes an outer shroud 36, an outer drainage layer 37, a filter layer 38, an inner drainage layer 40, and an inner shroud 41.

The outer shroud 36 has a plurality of perforations 48 or slots allowing fluid flow between the interior and exterior of the shroud. The outer shroud has radially inwardly extending projections 44 positioned on its interior surface 46 to provide radial stand-off space about the filter layer 38, so that fluid can readily flow between the perforated portions of the outer shroud 36 and the outer surface of the filter layer. The fluid can flow radially and longitudinally along the outer drainage layer 37. The projections 44 provide a stand-off which functions as an outer drainage layer 37. The outer shroud 36 serves to protect the screen jacket 32 during installation of the well screen assembly 30, during operations such as gravel packing, etc. In the example of FIG. 2, the outer shroud 26 can be made of a perforated, slotted or otherwise holed stainless steel material. The outer shroud can be a pre-formed tubular member or perforated tubular member; a metal sheet material formed into a tubular or cylindrical shape by wrapping (e.g., spiral or helical wrapping) and seam-welding, brazing, or otherwise attaching opposing longitudinal sides of the metal.

The filter layer 38 serves as the filtering element which excludes sand, formation fines, etc., from passing through the screen jacket 32. The filter layer 38 is shown as having two strata, laminates, or levels, 38a and 38b, but can alternately have a single or additional filter strata. The filter layer can be made of a relatively fine stainless steel wire mesh, woven wire mesh, sintered or unsintered metal, bonded or non-bonded metal, diffusion bonded material, etc., such as is known in the art. The various strata of the filter layer need not be of identical or similar construction.

An inner drainage layer 40 serves as an interface between the filter layer 38 and the inner shroud 50, providing flow paths for fluid exiting the filter layer to flow through the perforations 52 of the inner shroud 50. The inner shroud 50 provides radial support for the wrapped wire 54. In this example, the drainage layer 40 is defined by a stand-off between the inner shroud and filter layer provided by the wrapped wire 54. The wrapped wire is preferably a relatively coarse stainless steel wire. Alternate structures can be used, such as coarse welded wire mesh, etc., as is known in the art. The inner shroud 50 can be a perforated, slotted, or otherwise holed, pre-formed tubular member, a wrapped sheet material that is welded or otherwise bonded at opposing sides, etc. The base pipe 32 is as known in the art and typically a perforated, slotted, or otherwise holed tubular of metal defining an interior passageway 31 therein.

The screen jacket 32 has a relatively thin radial thickness, with the filter layer 38 in contact with the projections 44 of the outer shroud 36, with contact between the filter layer and wrapped wire of the drainage layer 40, and with minimal radial clearance 56 between the screen jacket and the base pipe 20. The screen assembly and base pipe of FIG. 2 are only exemplary. The embodiments disclosed herein include various types, combinations and arrangement of assembly layers and strata.

Figure 3A:
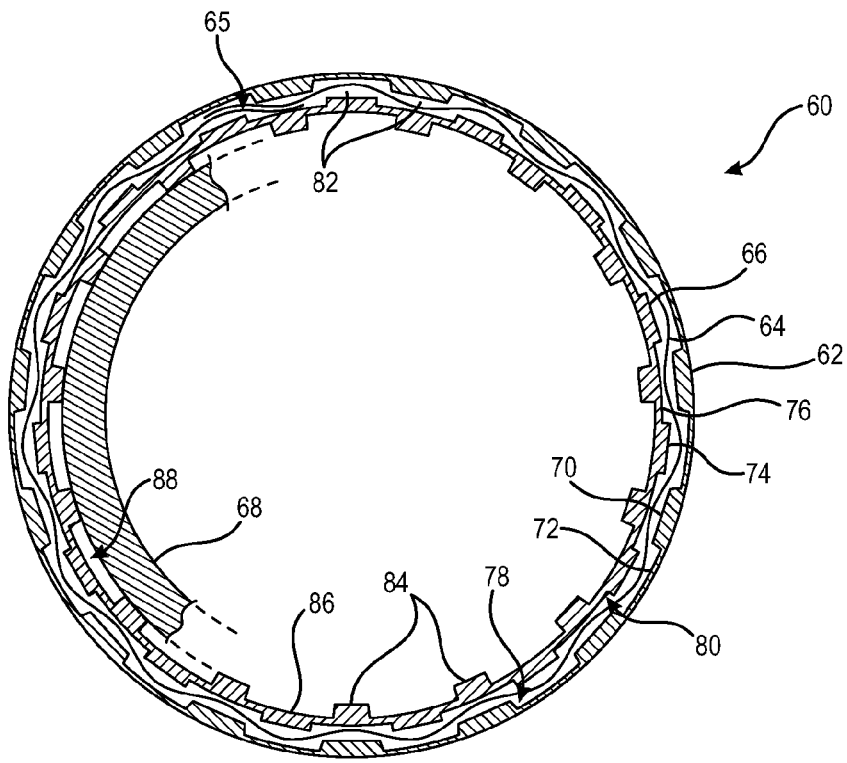
FIGS. 3A-3B are cross-sectional views of a mesh screen assembly according to an embodiment of the present invention.
Figure 3B:
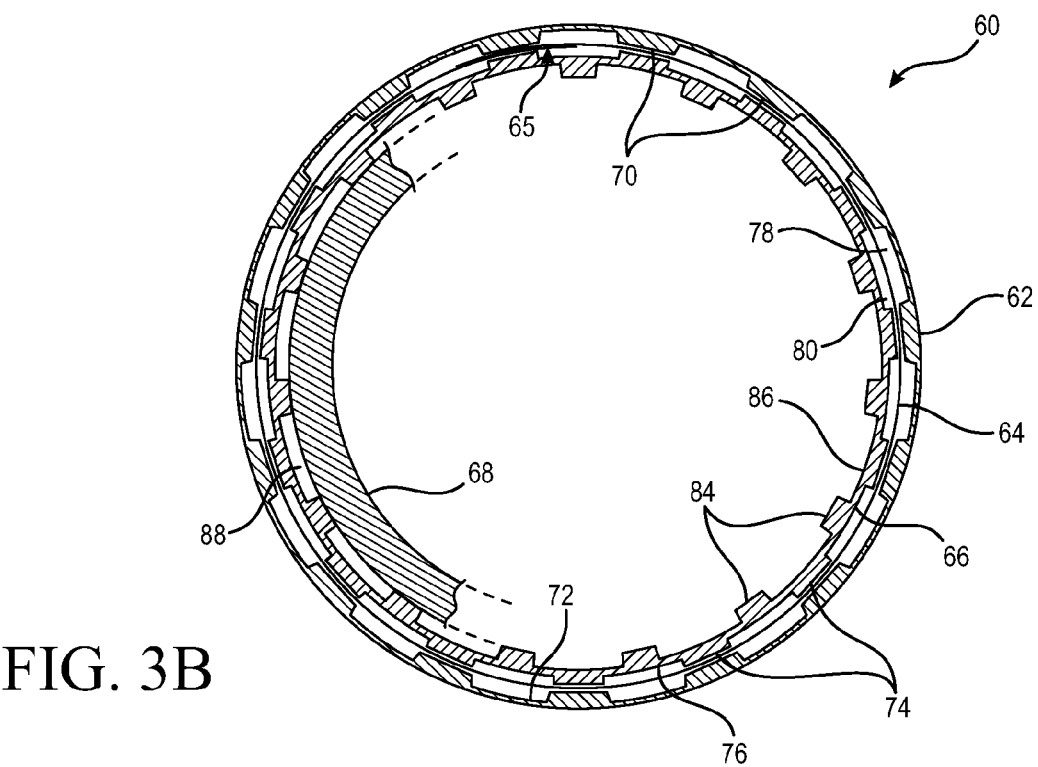

FIGS. 3A-3B are cross-sectional end views of an exemplary screen assembly and base pipe forming a sand control screen according to an aspect of the invention. FIG. 3A is a cross-sectional end view of an exemplary screen assembly and base pipe with the inner and outer tubular members in an initial or first position wherein the radial protrusions of one tubular member align with the gaps between radial protrusions of the other tubular member. FIG. 3B is a cross-sectional end view of the exemplary screen assembly and base pipe of FIG. 3A with the inner and outer tubular members in a final or second position wherein the radial protrusions of one tubular member align with the radial protrusions of the other tubular member.

Screen assembly 60 includes outer shroud 62, filter layer 64, and inner shroud 66. The screen assembly is shown positioned on a base pipe 68. Preferably, the filter layer 64 is made of a relatively fine, stainless steel, wire mesh, or woven wire, but may be of other filter constructions known in the art, and may include one or multiple strata. As used herein, the term filter layer is not limiting and includes woven, sintered, unsintered, bonded, non-bonded, or otherwise manufactured filter strata, single and multiple strata or laminate filter materials. The filter layer 64 preferably includes a filter material overlap 65, as seen in the Figures. The overlap is designed to prevent fines migration at the filter layer seam. Alternately, the filter layer can be welded, crimped or otherwise attached at its longitudinal sides, as is known in the art.

Outer and inner shrouds 62 and 66 are preferably made of a perforated stainless steel. The outer and/or inner shrouds can be or be referred to as perforated liners, shrouds, tubulars, screen pipes, sleeves, etc., such as are known in the art. The term "tubular member" is intended as a generic for such elements. Typically, the outer shroud 62 and inner shroud 66 are of similar construction and have a plurality of radial perforations through their peripheral walls. The outer shroud 62 has a plurality of radially inwardly extending protrusions 70 on its inner surface 72. These protrusions 70 can be longitudinally or laterally extending (or both) ribs, louvers, splines, fins, or projections, such as semi-spherical, cubical, or other-shaped, dimples, bumps, etc., spaced circumferentially and axially along the inner surface of the outer shroud. The inner shroud 66 has a plurality of radially inwardly extending protrusions 74 on its outer surface 76. These protrusions 74 can be longitudinally or laterally extending (or both) ribs, louvers, splines, fins, etc., or can be circumferentially and axially spaced apart projections, such as semi-spherical, cubical, or other-shaped, dimples, bumps, etc., on the outer surface of the inner shroud. The protrusions 70 and 74 define between them gaps 78 and 80, respectively.

Methods of assembly are provided which do not require secondary manufacturing processes to create the longitudinal seal, such as radial expansion, radial reduction, swaging, etc. Steps for end sealing, such as crimping, etc., may be added. Steps for attachment to the base pipe, such as welding, pinning, etc., are anticipated as potential additional steps. The steps presented may be performed in various combinations, and in various order, as will be understood by a person of skill in the art, without an explicit listing of all potential step orders and combinations. For example, where steps XYZ are presented in that order, it may be possible to perform the steps in alternate orders such as XZY, YXZ, YZX, etc.

Assembly of the screen assembly includes the following steps: the inner tubular member and outer tubular member are positioned with respect to one another such that the inner tubular member is positioned radially inward from the outer tubular member; the inner and outer tubular members are oriented such that the plurality of radially outwardly extending protrusions on the inner tubular member are aligned with a plurality of gaps defined between a corresponding plurality of radially inwardly extending protrusions on the outer tubular member (or alternately, the protrusions are "misaligned"); the filter layer is positioned between the inner and outer tubular members; the inner and outer tubular members are rotated with respect to one another to a second or final position such that the protrusions on the inner tubular member are aligned with the protrusions on the outer tubular member. (Use of the terms initial position and final position do not imply that prior or later steps cannot be performed, but merely indicate that the first position is used prior to the second position.)

The positioning of the inner and outer tubular members and positioning of the filter layer can occur in various order. For example, the filter layer can be moved to a position interior to the outer tubular member, then the inner tubular member moved into the filter layer. Or the filter layer can be moved over (radially outward from) the inner tubular member, and then the outer tubular member moved over the filter layer. Further, positioning of more than one layer may occur simultaneously. For example, an assembled inner tubular member and filter layer can be moved into the outer tubular member, etc. Further, which member or layer is moved and which is held stationary during assembly can be varied. Further, the movement of the members and layer can be lowering, raising, moving laterally, etc.

In the first position, seen in FIG. 3A, it is seen that the protrusions 74 of the inner tubular member 66 are radially aligned with the gaps 78 between protrusions 70 of the outer tubular member 62. Stated another way, the protrusions 74 are radially mis-aligned or unaligned with the protrusions 70. In this position, a radial clearance 82 is provided between the filter layer and each of the inner and outer tubular members 66 and 62. The clearances allow for positioning of the elements.

After the step of rotation, as seen in FIG. 3B, the elements are in a second position wherein the protrusions 70 and 74 are radially aligned. The radial clearances between the filter layer and tubular members is eliminated such that the protrusions 70 and 74 contact the filter layer, sandwiching the filter layer between the protrusions, and thus the tubular members. The gaps 78 and 80 defined between the protrusions 70 and 74, respectively, provide a stand-off between the filter layer and tubular members along a portion of the tubular members. This stand-off can provide additional flow areas.

Rotating the inner and outer tubular members with respect to one another can be accomplished by rotating one member while the other member remains stationary, or by rotating both members.

Additional assembly steps can be used as well. For example, the filter layer can be wrapped around the inner tubular member rather than dropped over the inner tubular member or dropped into the outer tubular member. In this example, the filter layer is positioned about the inner tubular prior to the positioning of the outer tubular. In a preferred embodiment, the inner and outer tubular members, and the filter layer, when moved into position but prior to rotation, define three coaxial cylinders with a small annular clearance between cylinders. In a preferred embodiment, the filter layer is generally cylindrical. However, depending on the assembly method chosen (for example, wrapping or dropping of a cylindrical filter layer), it may be desirable to shape or "weave" the filter layer, as seen in FIG. 3A.

The screen assembly is positioned on a perforated base pipe 68. Methods for the positioning are known in the art and not discussed herein. In a preferred embodiment, the inner shroud 66 also has radially inwardly extending protrusions 84 on its inner surface 86 that provide a stand-off between inner shroud and the base pipe 68. This stand-off defines an inner drainage layer 88 as discussed elsewhere herein. The protrusions discussed herein may be integrally formed with the inner and outer shrouds or secured by a suitable method of attachment, such as by welding.

Additional steps can include: creating a generally cylindrical filter layer, such as by wrapping, overlapping, welding, crimping, etc.; overlapping two ends of the filter layer; positioning a drainage layer radially inwardly from the filter layer; tightly packing the filter layer between the inner and outer tubular members; contacting an exterior surface of the filter layer with the plurality of radially inwardly extending protrusions and contacting an inner surface of the filter layer with the plurality of radially outwardly extending protrusions; creating a drainage layer between the inner tubular member and the base pipe; positioning the screen assembly on a base pipe; rotating the inner and outer tubular members with respect to one another from a first position with radial clearance between the filter layer and the inner and outer tubular members, to a second position with no radial clearance between the filter layer and the inner and outer tubular members; positioning the protrusions on the inner tubular member to be offset circumferentially and longitudinally relative to the protrusions on the outer tubular member; running the base pipe, filter layer and inner and outer tubular members into a subterranean wellbore; and/or producing hydrocarbon fluid through the filter layer.

Those of skill in the art will understand and appreciate that the specific details shown in FIGS. 3A-3B are provided only for purposes of illustration of the inventive concept embodied therein. As an example, FIGS. 3A-3B depict protrusions evenly spaced circumferentially about the inner and outer shrouds in a one-to-one relationship, but there is nothing whatsoever within the broader spirit and scope of the present invention limiting the protrusions to this particular number or relationship. In certain embodiments, there may be more than one type of protrusion, each type having different characteristics. These variations and others are squarely within the general spirit and scope of the present invention, as will be readily ascertained by one of skill in the art.

It may now be fully appreciated that the above disclosure provides many advancements to the art of constructing well screens. In particular, the described examples provide a well screen system which is radially compact, without undue undesirable stress and strain concentrations in its filter layer(s), resistant to corrosion, potentially without use of welding, brazing or heat-based methods applied to create the filter cylinder, convenient and economical to manufacture, and mechanically strengthened.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A method of making a well screen assembly, the method comprising the steps of:
    a) positioning an inner tubular member and an outer tubular member with respect to one another such that the inner tubular member is positioned radially inward from the outer tubular member, and such that a plurality of radially outwardly extending protrusions on the inner tubular member are aligned with a plurality of gaps defined between a corresponding plurality of radially inwardly extending protrusions on the outer tubular member;
    b) positioning a filter layer such that, upon assembly, the filter layer is positioned in an annular clearance space defined between the inner and outer tubular members; and
    c) rotating the inner and outer tubular members with respect to one another such that the protrusions on the inner tubular member are aligned with the protrusions on the outer tubular member, thereby sandwiching the filter layer and eliminating the annular clearance space. The above change is made to further clarify that upon the rotation of tubular members the filter layer is being sandwiched between the respective aligned protrusions on the tubular members.

2. The method of 1, further comprising the step of positioning a perforated base pipe radially inwardly from the inner tubular member.

3. The method of claim 2, further comprising the step of running the base pipe, filter layer and inner and outer tubular members into a subterranean wellbore.

4. The method of claim 3, further comprising the step of producing hydrocarbon fluid through the filter layer.

5. The methods of 1, further comprising the step of positioning a drainage layer radially inwardly from the filter layer.

6. The method of claim 5, wherein the drainage layer is at least partially defined by a plurality of radially inwardly extending protrusions on the inner tubular member.

7. The method of claim 1, wherein step b) further comprises creating a generally cylindrical filter layer.

8. The method of claim 7, further comprising the step of overlapping two ends of the filter layer.

9. The method of claim 1, wherein step b) is performed after the step of positioning the inner tubular member with respect to the outer tubular member.

10. The method of claim 1, wherein step b) is performed prior to the step of positioning the inner and outer tubular members with respect to one another.

11. The method of claim 1, wherein step b) further comprises wrapping the filter layer around the inner tubular member.

12. The method of claim 1, wherein step b) further comprises the step of sliding the filter layer between generally concentrically positioned inner and outer tubular members.

13. The method of claim 1, wherein the filter layer comprises multiple sub-layers of filter material.

14. The method of claim 1, wherein the filter layer comprises at least one of a sintered material, a sintered metal material, a wire mesh material, a multilayer wire mesh material, or a woven wire material.

15. The method of claim 1, wherein at least one of the inner and outer tubular members is a perforated screen shroud.

16. The method of claim 1, wherein step c) comprises rotating either the inner or outer tubular member while maintaining the other tubular member stationary.

17. The method of claim 1, wherein the plurality of radially outwardly extending protrusions on the inner tubular member include a plurality of longitudinally extending splines, longitudinally extending ribs, radially extending louvers, or radially extending projections.

18. The method of claim 1, wherein the plurality of radially inwardly extending protrusions on the outer tubular member include a plurality of longitudinally extending splines, longitudinally extending ribs, radially extending louvers, or radially extending protuberances.

19. The method of claim 1, wherein step c) further comprises the step tightly packing the filter layer between the inner and outer tubular members.

20. The method of claim 1, wherein step c) further comprises the step of contacting an exterior surface of the filter layer with the plurality of radially inwardly extending protrusions and contacting an inner surface of the filter layer with the plurality of radially outwardly extending protrusions.

21. The method of claim 1, wherein step c) further comprises the step of rotating the inner and outer tubular members with respect to one another from a first position with radial clearance between the filter layer and the inner and outer tubular members, to a second position with no radial clearance between the filter layer and the inner and outer tubular members.

22. The method of claim 1, wherein step a) further comprises the step of positioning the protrusions on the inner tubular member to be offset circumferentially and longitudinally relative to the protrusions on the outer tubular member.

* * * * *